(12) United States Patent
Tanabe et al.

(10) Patent No.: US 8,599,661 B2
(45) Date of Patent: Dec. 3, 2013

(54) OPTICAL DISK DEVICE, OPTICAL PICKUP, AND OPTICAL RECORDING MEDIUM

(75) Inventors: Norihiro Tanabe, Kanagawa (JP); Kimihiro Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/391,026

(22) PCT Filed: Aug. 12, 2010

(86) PCT No.: PCT/JP2010/063952
§ 371 (c)(1), (2), (4) Date: Mar. 19, 2012

(87) PCT Pub. No.: WO2011/024692
PCT Pub. Date: Mar. 3, 2011

(65) Prior Publication Data
US 2012/0163141 A1 Jun. 28, 2012

(30) Foreign Application Priority Data
Aug. 26, 2009 (JP) .................................. 2009-195690

(51) Int. Cl.
*G11B 7/00* (2006.01)
(52) U.S. Cl.
USPC ........................... 369/44.37; 369/94; 369/103
(58) Field of Classification Search
USPC ............ 369/94, 103, 112.23, 112.22, 112.24, 369/118, 44.37, 44.23, 44.27
See application file for complete search history.

(56) References Cited

U.S. PATENT DOCUMENTS

| | | | | |
|---|---|---|---|---|
| 2003/0063530 A1* | 4/2003 | Takehara et al. | ........... | 369/44.23 |
| 2007/0223326 A1* | 9/2007 | Yamamoto et al. | ........ | 369/44.28 |
| 2008/0037382 A1* | 2/2008 | Ueno | ........................ | 369/44.13 |
| 2008/0084796 A1* | 4/2008 | Kawasaki et al. | .......... | 369/44.14 |
| 2009/0022037 A1* | 1/2009 | Hotta et al. | .............. | 369/112.16 |
| 2009/0147652 A1* | 6/2009 | Fujita | ............................ | 369/100 |
| 2009/0175138 A1* | 7/2009 | Kim et al. | .................. | 369/44.11 |
| 2009/0245065 A1* | 10/2009 | Miyamoto et al. | ............. | 369/94 |
| 2010/0309759 A1* | 12/2010 | Sato et al. | .................. | 369/44.26 |

FOREIGN PATENT DOCUMENTS

| | | |
|---|---|---|
| JP | 2000-315323 A | 11/2000 |
| JP | 2003-109219 A | 4/2003 |
| JP | 2009-009635 A | 1/2009 |
| JP | 2009-277302 A | 11/2009 |
| WO | WO 2008/099708 A1 | 8/2008 |
| WO | WO 2009037773 A1 * | 3/2009 |

OTHER PUBLICATIONS

Kasami, Y., et al, Large Capacity and High-Data-Rate Phase-Change Disks, Jpn. J. Appl. Phys., Feb. 2000, pp. 756-761, vol. 39.

* cited by examiner

*Primary Examiner* — Thang Tran
(74) *Attorney, Agent, or Firm* — Wolf, Greenfield & Sacks, P.C.

(57) ABSTRACT

The present invention can properly correct spherical aberration.

An optical disk device (10) displaces an objective lens (18) so that the objective lens is displaced to a reference lens position as a reference. The optical disk device (10) controls an information light condensing point changing mechanism (55) so as to adjust the focus (FM) of an information light beam (LM) to a recording depth (X) at which the information light beam (LM) is to be applied in a state of the objective lens (18) being placed at a reference lens position (SL). The optical disk device (10) controls a servo light condensing point changing mechanism (35) so as to adjust the focus (FS) of a servo light beam (LS) to a servo layer (104) in the state of the objective lens (18) being placed at the reference lens position (SL).

19 Claims, 12 Drawing Sheets

OPTICAL DISK DEVICE, OPTICAL PICKUP, AND OPTICAL RECORDING MEDIUM

CROSS REFERENCE TO RELATED APPLICATIONS

This application claims the benefit under 35 U.S.C. §371 as a U.S. national stage entry of International Patent Application Serial No. PCT/JP2010/063952 filed on Aug. 12, 2010, which claims priority to Japanese Priority Patent Application JP 2009-195690, filed in the Japan Patent Office on Aug. 26, 2009. The entire contents of both applications are incorporated herein by reference to the maximum extent allowable by the law.

TECHNICAL FIELD

The present invention relates to an optical disk device, an optical pickup, and an optical recording medium, and is suitable for application to an optical disk device adapted to a system of forming a plurality of mark layers within one recording layer, for example.

BACKGROUND ART

Conventionally, as an optical recording medium, a disk-shaped optical recording medium has widely spread, and CDs (Compact Discs), DVDs (Digital Versatile Discs), Blu-ray Discs (registered trademark, which Blu-ray Discs will hereinafter be referred to as BDs), and the like are generally used.

In this optical recording medium, a recording layer is irradiated with condensed light, and the presence or absence of a recording mark formed in the recording layer is detected from an amount of light reflected from the recording layer. At this time, the size of the spot of the light condensed by an objective lens is given by approximately $\lambda/NA$ ($\lambda$=Wavelength of Light and NA=Numerical Aperture of Objective Lens), and resolution is proportional to this value.

In the optical recording medium, an amount of information recordable per recording layer can be increased by reducing the size of the spot of the light. For example, Non-Patent Document 1 describes details of a BD, which optical recording medium of 12 [cm] in diameter has information of 25 [GB] recorded thereon.

The optical recording medium causes a spherical aberration according to a distance from the surface thereof to the recording layer. Thus, an optical information recording and reproducing device ready for such an optical recording medium adds a spherical aberration to condensed light in advance, and thereby suppresses the spherical aberration in the vicinity of the focus of the light and keeps the size of the spot small.

Incidentally, the optical information recording and reproducing device records various information such as various kinds of contents including music contents and video contents, various kinds of data for computers, or the like onto the optical recording medium. In particular, there have recently been an increase in amount of information due to higher definition of video, higher sound quality of music, and the like, and a demand for an increase in number of contents to be recorded on one optical recording medium. There is thus a desire for even higher capacity of the optical recording medium.

Accordingly, as one method for increasing the capacity of the optical recording medium, an optical recording medium has been proposed in which a material forming a recording mark according to light is used and information is recorded three-dimensionally in a direction of thickness of the optical recording medium (see Patent Document 1, for example).

PRIOR ART DOCUMENTS

Patent Documents

Patent Document 1: Japanese Patent Laid-Open No. 2009-9635
Patent Document 2: Japanese Patent Laid-Open No. 2009-009634
Patent Document 3: Japanese Patent Laid-Open No. 2008-71433

Non-Patent Document

Non-Patent Document 1: Y. Kasami, Y. Kuroda, K. Seo, O. Kawakubo, S. Takagawa, M. Ono, and M. Yamada, Jpn. J. Appl. Phys., 39, 756 (2000)

SUMMARY OF INVENTION

It is assumed that a plurality of mark layers are formed within one recording layer in the optical recording medium described in Patent Document 1. Thus, an amount of spherical aberration occurs over a wide range, and the spherical aberration cannot be corrected properly.

The present invention has been made in consideration of the above points, and is to propose an optical pickup and an optical disk device that can properly correct spherical aberration and an optical recording medium that enables spherical aberration to be corrected properly.

In order to solve such problems, an optical disk device according to the present invention includes: an objective lens for condensing information light applied to a recording layer of an optical recording medium, the optical recording medium having the recording layer for recording information by forming a three-dimensional recording mark and a servo layer for a servo, the servo layer being disposed so as to be adjacent to the recording layer, and condensing servo light applied to the servo layer; a lens driving section configured to displace the objective lens; an information light condensing point changing mechanism for displacing a focus of the information light; a servo light condensing point changing mechanism for displacing a focus of the servo light; and a control section configured to control the lens driving section so as to displace the objective lens to a reference lens position as a reference, control the information light condensing point changing mechanism so as to adjust the focus of the information light to a recording depth at which the information light is to be applied in a state of the objective lens being placed at the reference lens position, and control the servo light condensing point changing mechanism so as to adjust the focus of the servo light to the servo layer in the state of the objective lens being placed at the reference lens position.

Thereby, the optical disk device can correct the spherical aberration of the servo light by the servo light condensing point changing mechanism, and therefore set the reference lens position freely.

In addition, an optical pickup according to the present invention includes: an objective lens for condensing information light applied to a recording layer of an optical recording medium, the optical recording medium having the recording layer for recording information by forming a three-dimensional recording mark and a servo layer for a servo, the servo layer being disposed so as to be adjacent to the recording layer, and condensing servo light applied to the servo layer; a lens driving section configured to displace the objective lens to a reference lens position as a reference; an information light condensing point changing mechanism for displacing a focus of the information light so as to adjust the focus of the information light to a recording depth at which the information light is to be applied in a state of the objective lens being placed at the reference lens position; and a servo light condensing point changing mechanism for displacing a focus of the servo light so as to adjust the focus of the servo light to the servo layer in a state of the information light condensing point changing mechanism being controlled and the objective lens being placed at the reference lens position.

Thereby, the optical pickup can correct the spherical aberration of the servo light by the servo light condensing point changing mechanism, and therefore set the reference lens position freely.

Further, an optical recording medium according to the present invention includes: a recording layer for recording information by forming a three-dimensional recording mark over a plurality of mark layers; and a servo layer for a servo, the servo layer being disposed so as to be adjacent to a side of a plane of incidence of the recording layer, information light being made incident on the plane of incidence; wherein indicating information on an index of refraction is recorded in a first mark layer from the servo layer in the recording layer.

Thereby, the optical recording medium enables the indicating information to be read in a state of a minimum spherical aberration, and enables spherical aberration to be corrected on the basis of the indicating information.

According to the present invention, it is possible to correct the spherical aberration of the servo light by the servo light condensing point changing mechanism, and therefore set the reference lens position freely. Thus, an optical pickup and an optical disk device capable of properly correcting spherical aberration can be realized.

In addition, according to the present invention, it is possible to make the indicating information read in a state of a minimum spherical aberration, and make spherical aberration corrected on the basis of the indicating information. Thus, an optical recording medium enabling spherical aberration to be corrected properly can be realized.

MODE FOR CARRYING OUT THE INVENTION

Figure 1:
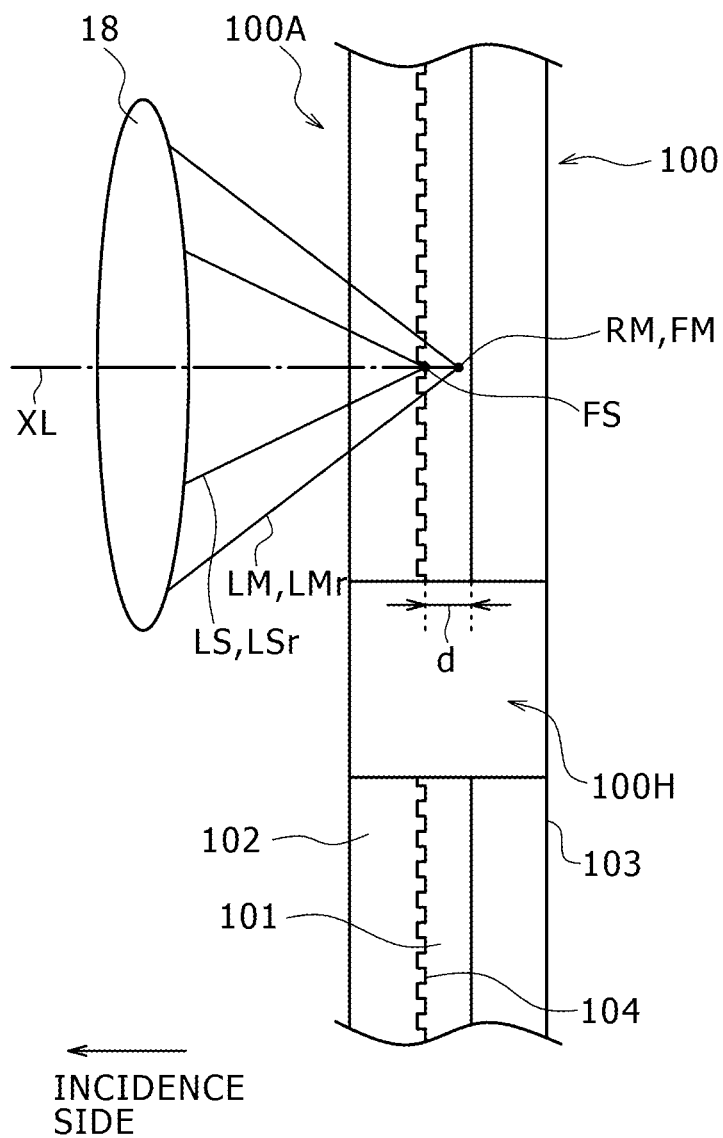
FIG. 1 is a schematic diagram showing a constitution of an optical disk.

Embodiments of the present invention will hereinafter be described in detail with reference to the drawings. Incidentally, description will be made in the following order.

1. First Embodiment (Correction of Spherical Aberration by Cooperation of Relay Lenses)

2. Second Embodiment (Correction of Spherical Aberration Occurring according to Index of Refraction)

3. Other Embodiments

1. First Embodiment

[1-1. Constitution of Optical Disk]

The constitution of an optical disk will first be described. In the present embodiment, information is recorded by irradiating an optical disk 100 with an information light beam LM from an optical disk device 10, and information is read from the optical disk 100 by detecting an information reflected light beam LMr formed by the reflection of the information light beam LM.

In actuality, the optical disk 100 is formed substantially in the shape of a disk, and has a hole part 100H for chucking in a central part of the optical disk 100. In addition, as shown in a sectional view of FIG. 1, the optical disk 100 has a constitution such that both surfaces of a recording layer 101 for recording information are sandwiched between substrates 102 and 103.

The optical disk device 10 condenses the information light beam LM emitted from a predetermined light source into the recording layer 101 of the optical disk 100 by an objective lens 18. When the information light beam LM has a relatively high intensity for recording, a recording mark RM is formed at the position of a focus FM within the recording layer 101.

The optical disk 100 further includes a servo layer 104 between the recording layer 101 and the substrate 102. In the servo layer 104, a guiding groove for a servo is formed, or specifically, a track in a spiral form (which track will hereinafter be referred to as a servo track) STR is formed by lands and grooves similar to those of an ordinary BD (Blu-ray Disc, registered trademark)-R (Recordable) disk or the like.

This servo track STR has an address formed by a consecutive number which address is given to each of predetermined recording units, so that a servo track to be irradiated with a servo light beam LS when information is recorded or reproduced (which servo track will hereinafter be referred to as a target servo track TSG) can be identified by the address.

Incidentally, in the servo layer 104 (that is, a boundary surface between the recording layer 101 and the substrate 102), pits or the like may be formed in place of the guiding groove, or a combination of a guiding groove and pits or the like may be formed. In addition, the track in the servo layer 104 may be in a concentric form rather than a spiral form.

In addition, the servo layer 104 is for example formed so as to reflect a red light beam having a wavelength of about 660 [nm] with a high reflectance and transmit a blue-violet light beam having a wavelength of about 405 [nm] with a high transmittance.

The optical disk device 10 irradiates the optical disk 100 with a servo light beam LS of a wavelength of about 660 [nm].

At this time, the servo light beam LS is reflected by the servo layer 104 in the optical disk 100 to become a servo reflected light beam LSr.

The optical disk device 10 receives the servo reflected light beam LSr, and controls the position of the objective lens 40 in a focus direction of bringing the objective lens 40 closer to the optical disk 100 or separating the objective lens 40 from the optical disk 100 on the basis of a result of the light reception. The optical disk device 10 thereby adjusts the focus FS of the servo light beam LS to the servo layer 104.

At this time, the optical disk device 10 makes the optical axes XL of the servo light beam LS and the information light beam LM substantially coincide with each other. The optical disk device 10 thereby positions the focus FM of the information light beam LM at a spot corresponding to the target servo track TSG within the recording layer 101, that is, on a normal perpendicular to the servo layer 104 which normal passes through the target servo track TSG.

When the inside of the recording layer 101 is irradiated with an information light beam LM of a relatively high intensity, the recording layer 101 forms air bubbles, for example, whereby a recording mark RM is recorded at the position of the focus FM. Incidentally, the recording layer 101 may form a recording mark RM by changing a local index of refraction by for example a chemical change or the like.

In addition, recording marks RM thus formed are arranged in a planar form substantially in parallel with the respective surfaces of a plane of incidence 100A of the optical disk 100 and the servo layer 104 and the like, and a mark layer Y is formed by the recording marks RM.

On the other hand, when information is reproduced from the optical disk 100, the optical disk device 10 condenses the information light beam LM at a target position PG from the side of the plane of incidence 100A, for example. In this case, when a recording mark RM is formed at the position of the focus FM (that is, the target position PG), the information light beam LM is reflected by the recording mark RM, and an information reflected light beam LMr is emitted from the recording mark RM. Incidentally, a distance from the plane of incidence 100A to the target position PG in the focus direction will hereinafter be referred to as a recording depth X.

The optical disk device 10 generates a detection signal according to a result of detection of the information reflected light beam LMr, and detects whether the recording mark RM is formed or not on the basis of the detection signal.

Thus, in the present embodiment, when the optical disk device 10 records and reproduces information on the optical disk 100, the desired information is recorded and reproduced by irradiating the target position PG with the information light beam LM while using the servo light beam LS in combination.

[1-2. Optical Disk Device]

[1-2-1. Constitution of Optical Disk Device]

A concrete constitution of the optical disk device 10 will next be described.

Figure 2:
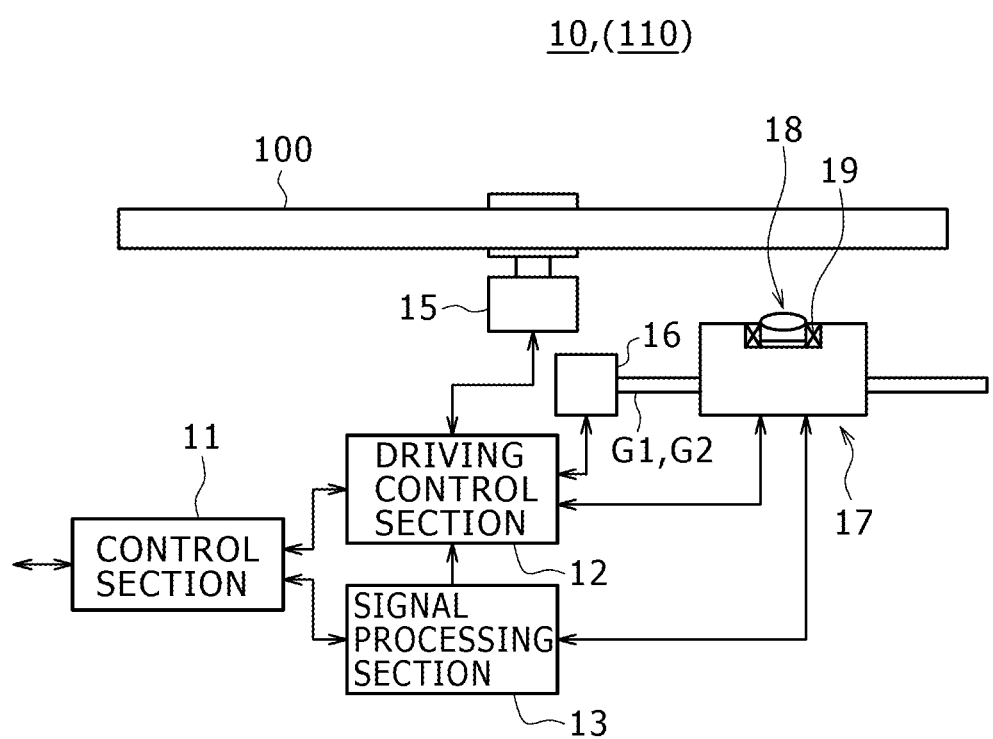
FIG. 2 is a schematic diagram showing a general constitution of an optical disk device.

As shown in FIG. 2, the optical disk device 10 is formed with a control section 11 as a central part. The control section 11 includes a CPU (Central Processing Unit) not shown in the figure, a ROM (Read Only Memory) storing various programs and the like, and a RAM (Random Access Memory) used as a working memory for the CPU.

When information is to be recorded on the optical disk 100, the control section 11 makes a spindle motor 15 rotation-driven via a driving control section 12 to make the optical disk 100 mounted on a turntable (not shown) rotated at a desired speed.

In addition, the control section 11 drives a sled motor 16 via the driving control section 12, and thereby greatly moves an optical pickup 17 in a tracking direction, that is, in a direction of going toward the inner circumference side or the outer circumference side of the optical disk 100 along moving shafts G1 and G2.

The optical pickup 17 has a plurality of optical parts such as the objective lens 18 and the like attached thereto. The optical pickup 17 irradiates the optical disk 100 with the information light beam LM and the servo light beam LS under control of the control section 11, and detects a servo reflected light beam LSr formed by the reflection of the servo light beam LS.

The optical pickup 17 generates a plurality of detection signals on the basis of a result of the detection of the servo reflected light beam LSr, and supplies these detection signals to a signal processing section 13. The signal processing section 13 generates each of a focus error signal SFE and a tracking error signal STE by performing predetermined arithmetic processing using the supplied detection signals, and supplies these error signals to the driving control section 12.

Incidentally, the focus error signal SFE is a signal representing an amount of shift of the servo light beam LS in the focus direction with respect to the servo layer 104. In addition, the tracking error signal STE is a signal representing an amount of shift of the servo light beam LS in the tracking direction with respect to the servo track STR as a target of the servo light beam LS (which servo track will hereinafter be referred to as a target servo track STG).

The driving control section 12 generates a focus driving signal and a tracking driving signal for driving the objective lens 18 on the basis of the focus error signal SFE and the tracking error signal STE supplied, and supplies this to a two-axis actuator 19 of the optical pickup 17.

The two-axis actuator 19 of the optical pickup 17 performs focus control and tracking control on the objective lens 18 on the basis of the focus driving signal and the tracking driving signal to make the focus FS of the servo light beam LS condensed by the objective lens 18 follow the target servo track STG of a mark layer Y as a target (which mark layer will hereinafter be referred to as a target mark layer YG).

At this time, the control section 11 forms a recording mark RM on the target track TG of the target mark layer YG by modulating the intensity of the information light beam LM on the basis of externally supplied information, so that the information can be recorded.

In addition, when the information is to be reproduced from the optical disk 100, the optical pickup 17 makes the focus FS of the servo light beam LS follow the target servo track STG as at the time of recording, and irradiates the target track TG of the target mark layer YG with a relatively weak information light beam LM of a substantially constant intensity to detect an information reflected light beam LMr formed by the reflection of the information light beam LM at a spot where the recording mark RM is formed.

The optical pickup 17 generates a detection signal on the basis of a result of the detection of the information reflected light beam LMr, and supplies this detection signal to the signal processing section 13. The signal processing section 13 can reproduce the information recorded as the recording mark RM on the target track TG of the target mark layer YG by subjecting the detection signal to predetermined arithmetic processing, demodulation processing, decoding processing, and the like.

[1-2-2. Constitution of Optical Pickup]

Figure 3:
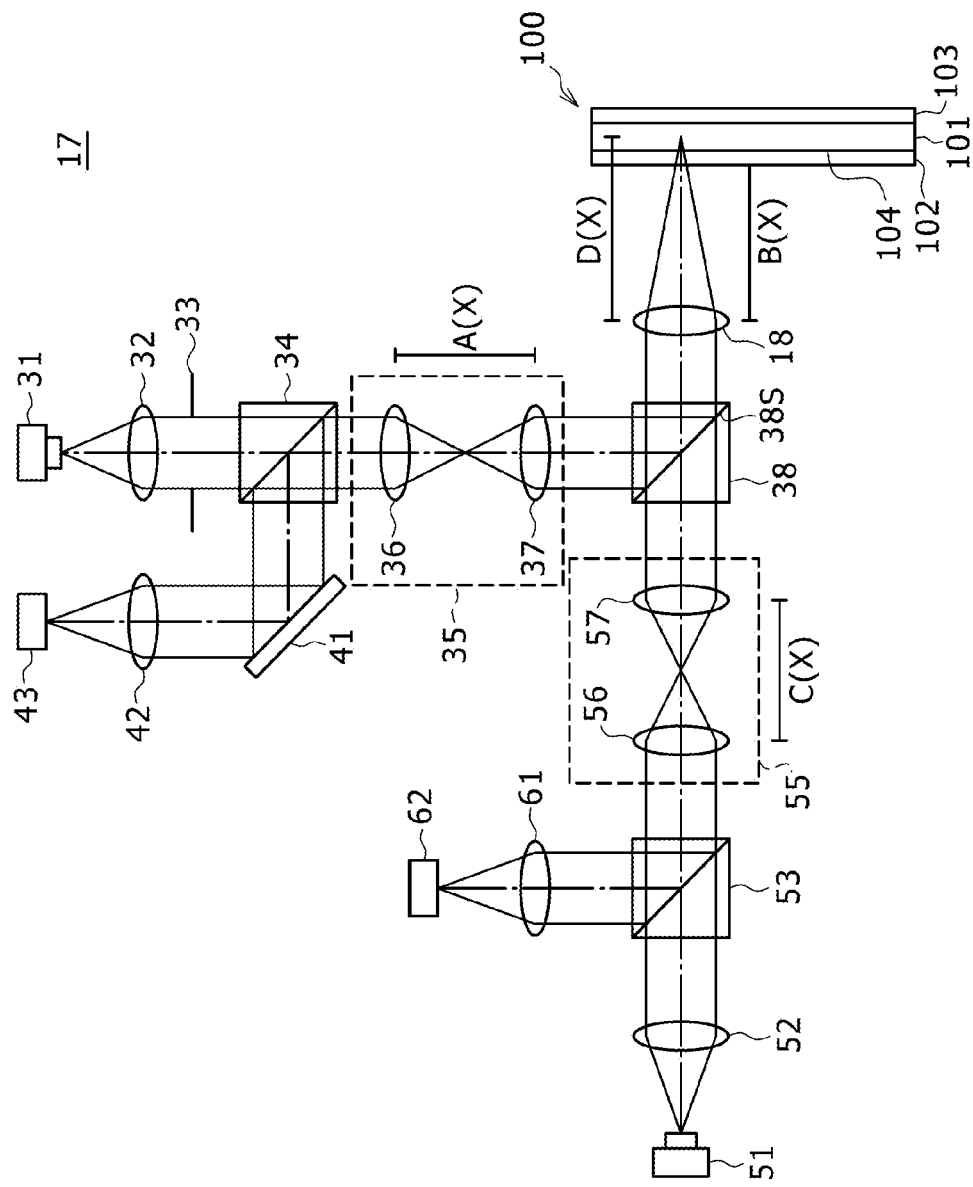
FIG. 3 is a schematic diagram showing a constitution of an optical pickup.

The constitution of the optical pickup 17 will next be described. As shown in FIG. 3, the optical pickup 17 has laser diodes 31 and 51. The laser diode 31 emits the servo light beam LS for servo control. On the other hand, the laser diode 51 emits the information light beam LM for recording and reproduction.

The optical pickup 17 makes the servo light beam LS and the information light beam LM incident on the same objective lens 18, and irradiates the optical disk 100 with the servo light beam LS and the information light beam LM.

[1-2-2-1. Optical Path of Servo Light Beam]

The servo light beam LS emitted from the laser diode 31 is applied to the optical disk 100 via the objective lens 18. This servo light beam LS is reflected by the optical disk 100, and becomes a servo reflected light beam LSr, which is received by a photodetector 43.

Specifically, the laser diode 31 emits the servo light beam LS of a predetermined light quantity, the servo light beam LS being formed by divergent light, under control of the control section 11 (FIG. 2) to make the servo light beam LS incident on a collimator lens 32. The collimator lens 32 converts the servo light beam LS from the divergent light to collimated light, and makes the servo light beam LS incident on an aperture limiting section 33.

The aperture limiting section 33 limits the luminous flux diameter of the servo light beam LS, and makes the servo light beam LS incident on a beam splitter 34.

The beam splitter 34 transmits a part of the servo light beam LS, and makes the part of the servo light beam LS incident on a servo light condensing point changing mechanism 35. The servo light condensing point changing mechanism 35 is formed as a relay lens composed of a convex movable lens 36 and a convex fixed lens 37. The movable lens 36 converts the servo light beam LS from the collimated light to convergent light.

The fixed lens 37 changes a state of convergence and divergence (which state will hereinafter be referred to as a convergence state) of the servo light beam LS that has become divergent light after converging. That is, the servo light condensing point changing mechanism 35 can change the convergence state of the servo light beam LS according to the position of the movable lens 36.

As a result, the servo light condensing point changing mechanism 35 can change the convergence state of the servo light beam LS when made incident on the objective lens 18, and adjust the focal position in the focus direction of the servo light beam LS (which focal position will hereinafter be referred to as a servo light focal position). The servo light condensing point changing mechanism 35 drives the movable lens 36 so that the servo light focal position is adjusted to the servo layer 104, and makes the servo light beam LS incident on a dichroic prism 38.

Incidentally, the objective lens 18 adds a spherical aberration to the servo light beam LS before being made incident on the optical disk 100 in relation to the servo light condensing point changing mechanism 35. Thereby, the spherical aberration of the servo light beam LS at the servo light focal position located within the optical disk 100 can be minimized by being cancelled out by a spherical aberration occurring within the optical disk 100.

The dichroic prism 38 has a reflecting and transmitting surface 38S that reflects or transmits a light beam according to the wavelength of the light beam. The reflecting and transmitting surface 38S reflects the servo light beam LS, and makes the servo light beam LS incident on the objective lens 18.

The objective lens 18 has a numerical aperture NA of 0.85. Because the luminous flux diameter of the servo light beam LS is limited by the aperture limiting section 33, the objective lens 18 can be made to function as a lens having a numerical aperture NA of about 0.613.

Specifically, the objective lens 18 enables recording and reproduction at a linear density similar to that of a BD by condensing the information light beam LM as a lens having a numerical aperture NA=0.85. In this case, the objective lens 18 cannot make the spot of the servo light beam LS equal to that of the information light beam LS due to a difference in wavelength.

Therefore, grooves and lands at double the track pitch of a BD are formed in the servo layer 104 of the optical disk 100. The optical pickup 17 realizes recording and reproduction at a recording density similar to that of a BD per mark layer Y by generating a tracking error signal from both of the grooves and the lands.

A ratio between the wavelengths of the servo light beam LS and the information light beam LM (660 [nm]/405 [nm]) is 1.44. Thus, by making the objective lens 18 function as a lens having a numerical aperture NA=0.85×1.44/2=0.613, the spot size of the servo light beam LS can be a size suitable for the grooves and the lands of about twice a width in a BD.

The objective lens 18 condenses the servo light beam LS, and applies the servo light beam LS to the servo layer 104 in the optical disk 100. At this time, as shown in FIG. 1, the servo light beam LS passes through the substrate 102, is reflected in the servo layer 104, and becomes a servo reflected light beam LSr going in an opposite direction from the servo light beam LS.

Thereafter, the servo reflected light beam LSr is made incident on the dichroic prism 38 via the objective lens 18. The dichroic prism 38 reflects the servo reflected light beam LSr according to the wavelength, and makes the servo reflected light beam LSr incident on the servo light condensing point changing mechanism 35.

The servo light condensing point changing mechanism 35 converts the servo reflected light beam LSr into collimated light, and makes the servo reflected light beam LSr incident on the beam splitter 34. The beam splitter 34 reflects a part of the servo reflected light beam LSr, and makes the part of the servo reflected light beam LSr incident on a condensing lens 42 via a mirror 41.

The condensing lens 42 converges the servo reflected light beam LSr, and irradiates a photodetector 43 with the servo reflected light beam LSr.

In the optical disk device 10, surface wobbling or the like of the optical disk 100 in a rotating state may occur, and therefore the position of the target servo track TSG relative to the objective lens 18 may vary.

Accordingly, the objective lens 18 can be driven in two axial directions, that is, the focus direction and the tracking direction by the two-axis actuator 19.

The photodetector 43 generates a detection signal corresponding to the light quantity of the servo reflected light beam LSr, and sends out the detection signal to the signal processing section 13 (FIG. 2).

Specifically, the photodetector 43 has a plurality of detecting regions (not shown) for receiving the servo reflected light beam LSr. The photodetector 43 detects a part of the servo reflected light beam LSr by each of the plurality of detecting regions, generates respective detection signals according to light quantities detected at this time, and sends out these detection signals to the signal processing section 13 (FIG. 2).

The signal processing section 13 for example calculates a focus error signal SFE by an astigmatic method and a tracking error signal STE by a push-pull method, and supplies this to the driving control section 12.

The driving control section 12 performs focus control and tracking control on the basis of the focus error signal SFE and the tracking error signal STE.

Thus, the optical pickup 17 irradiates the servo layer 104 in the optical disk 100 with the servo light beam LS, and supplies a result of reception of the servo reflected light beam LSr as reflected light of the servo light beam LS to the signal processing section 13. According to this, the driving control section 12 performs focus control and tracking control on the objective lens 18 so that the servo light beam LS is focused on the target servo track TSG of the servo layer 104.

[1-2-2-2. Optical Path of Information Light Beam]

Meanwhile, the optical pickup 17 irradiates the optical disk 100 with the information light beam LM emitted from the laser diode 51 via the objective lens 18. The information reflected light beam LMr formed by reflection by the optical disk 100 is received by a photodetector 62.

Specifically, the laser diode 51 emits the information light beam LM of a predetermined light quantity, the information light beam LM being formed by divergent light, under control of the control section 11 (FIG. 2) to make the information light beam LM incident on a collimator lens 52. The collimator lens 52 converts the information light beam LM from the divergent light to collimated light, and makes the information light beam LM incident on a beam splitter 53.

The beam splitter 53 transmits a part of the information light beam LM, and makes the part of the information light beam LM incident on an information light condensing point changing mechanism 55. The information light condensing point changing mechanism 55 is formed as a relay lens composed of a convex movable lens 56 and a convex fixed lens 57. The movable lens 56 converts the information light beam LM from the collimated light to convergent light.

The fixed lens 57 changes a convergence state of the information light beam LM that has become divergent light after converging. That is, the information light condensing point changing mechanism 55 can change the convergence state of the information light beam LM according to the position of the movable lens 56.

As a result, the information light condensing point changing mechanism 35 can change the convergence state of the servo light beam LS when made incident on the objective lens 18, and adjust the focal position in the focus direction of the information light beam LM (which focal position will hereinafter be referred to as an information light focal position). The information light condensing point changing mechanism 55 drives the movable lens 56 so that the information light focal position is adjusted to the recording depth X, and makes the information light beam LM incident on the dichroic prism 38.

The dichroic prism 38 transmits the information light beam LM by the reflecting and transmitting surface 38S, and makes the information light beam LM incident on the objective lens 18.

The objective lens 18 condenses the information light beam LM, and irradiates the optical disk 100 with the information light beam LM. At this time, as shown in FIG. 1, the information light beam LM passes through the substrate 102, and is focused within the recording layer 101.

Incidentally, the objective lens 18 adds a spherical aberration to the information light beam LM before being made incident on the optical disk 100 in relation to the information light condensing point changing mechanism 55. Thereby, the spherical aberration of the information light beam LM at the information light focal position located within the optical disk 100 can be minimized by being cancelled out by a spherical aberration occurring within the optical disk 100.

Further, the optical pickup 17 makes the tracking direction of the focus FM of the information light beam LM coincide with the target position PG by applying the information light beam LM via the servo-controlled objective lens 18.

The information light beam LM is then condensed to the focus FM by the objective lens 18 so as to be able to form a recording mark RM at the target position PG.

On the one hand, in a reproducing process for reading information recorded on the optical disk 100, when a recording mark RM is recorded at the target position PG, the information light beam LM condensed to the focus FM is reflected as a information reflected light beam LMr by the recording mark RM, and is made incident on the objective lens 18.

On the other hand, when no recording mark RM is recorded at the target position PG, the information light beam LM passes through the optical disk 100, and thus almost no information reflected light beam LMr is generated.

The objective lens 18 converges the information reflected light beam LMr to a certain degree, and makes the information reflected light beam LMr incident on the information light condensing point changing mechanism 55 via the dichroic prism 38.

The information light condensing point changing mechanism 55 converts the information reflected light beam LMr into collimated light, and makes the information reflected light beam LMr incident on the beam splitter 53.

The beam splitter 53 reflects the information reflected light beam LMr, and makes the information reflected light beam LMr incident on a multilens 61. The multilens 61 condenses the information reflected light beam LMr, and irradiates the photodetector 62 with the information reflected light beam LMr.

The photodetector 62 generates a detection signal SDb according to the light quantity of the information reflected light beam LMr, and supplies the detection signal SDb to the signal processing section 13 (FIG. 2).

The signal processing section 13 generates reproduced information by subjecting the reproduced detection signal SDb to predetermined demodulation processing, decoding processing, and the like, and supplies the reproduced information to the control section 11.

Thus, an information optical system 50 receives the information reflected light beam LMr made incident on the objective lens 18 from the optical disk 100, and supplies a result of the light reception to the signal processing section 13.

[1-3. Setting of Reference Lens Position]

In addition to such a constitution, the optical pickup 17 according to the present embodiment varies the reference lens position of the objective lens 18 according to the recording depth X (position in the focus direction of the target position PG).

Figure 4:
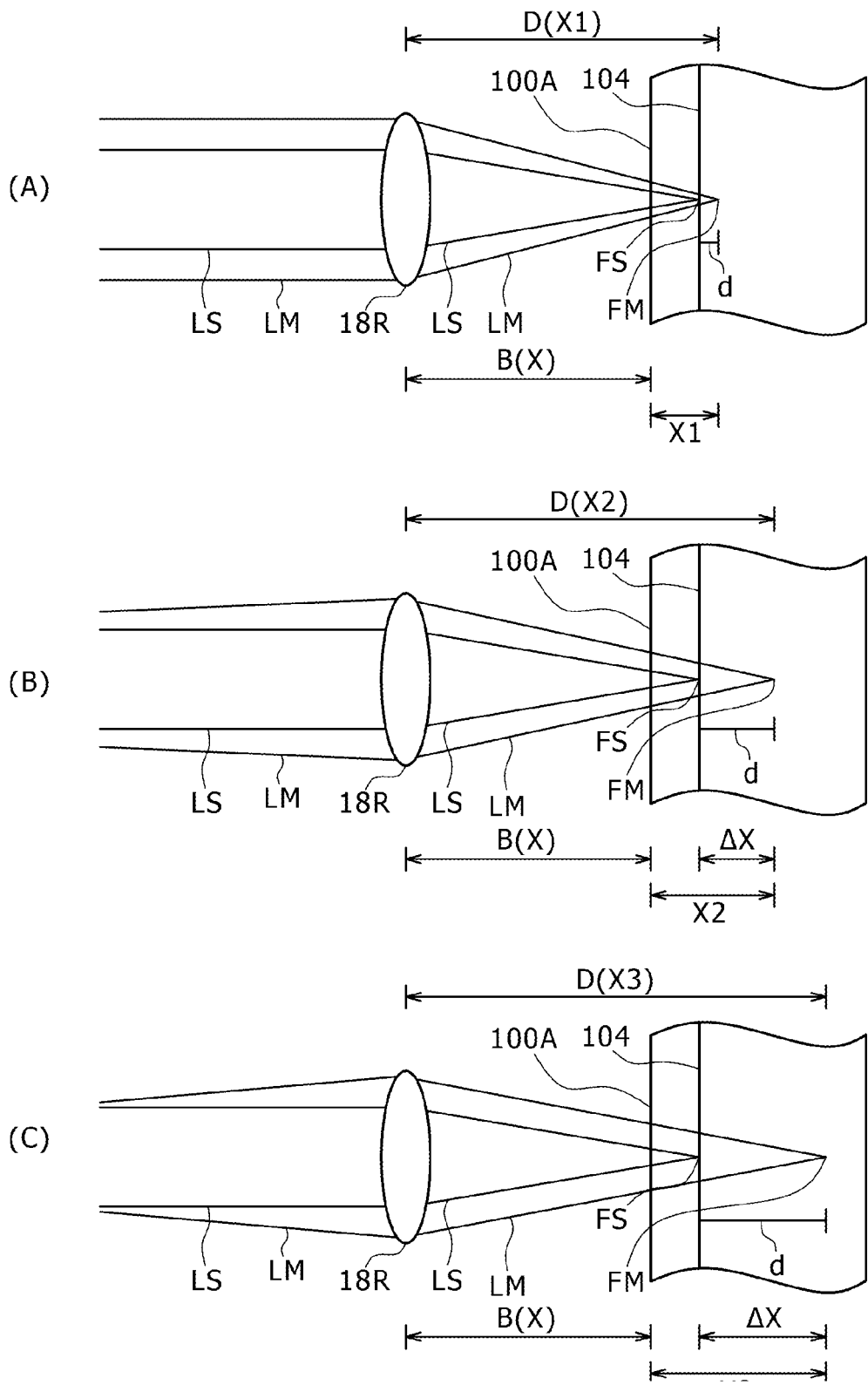
FIG. 4 is a schematic diagram of assistance in explaining conventional relation between recording depth and a reference lens position.

As described above, the optical pickup 17 focuses the servo light beam LS onto the servo layer 104. At this time, as shown in FIG. 4, the optical pickup 17 separates the focus FM of the information light beam LM from the focus FS of the servo light beam LS by a separation distance d, and thereby positions the focus FM at the recording depth X with the servo layer 104 as a reference.

In the following, attention will be directed to a conventional optical pickup that moves an information light focal position to a recording depth X in a state of the reference lens position of an objective lens 18 being fixed. In the following, the conventional optical pickup will be differentiated from the optical pickup 17 according to the present invention by adding R to the ends of reference numerals of the conventional optical pickup. In this case, the conventional optical pickup fixes a distance B(X) from an objective lens 18R to a plane of incidence 100A (which distance will hereinafter be referred to as a working distance) irrespective of the recording depth X.

As shown in (A), (B), and (C) of FIG. 4, the conventional optical pickup needs to increase a distance D(X) from the objective lens 18R to the recording depth X (which distance will hereinafter be referred to as a lens depth interval) by ΔX as the recording depth X is displaced by ΔX from X1 to X2 and to X3. That is, in the conventional optical pickup, when the recording depth X varies greatly according to the thickness of a recording layer 101, an amount of variation in the lens depth interval D(X) is increased.

As a result, the conventional optical pickup needs to drive a movable lens 56 in an information light condensing point changing mechanism 55R greatly in order to correct spherical aberration occurring according to the recording depth X.

The conventional optical pickup drives the objective lens 18R according to the surface wobbling or the like of an optical disk 100. The wave fronts of collimated light are parallel irrespective of a distance from a fixed lens 57. Thus, even when the distance from the fixed lens 57 varies, the objective lens 18R can input an information light beam LM composed of identical wave fronts, and form a focus FM at an identical focal length at all times.

However, when the convergence state of the information light beam LM is enhanced (a degree of convergence or divergence is increased), and the movable lens 56 is driven greatly, the conventional optical pickup cannot form the focus FM at the identical focal length.

For example, when the information light beam LM is diverged greatly, the luminous flux diameter of the information light beam LM changes according to the distance from the fixed lens 57. Divergent light has a wave front closer to that of collimated light at the center of the luminous flux. Thus, when the distance from the fixed lens 57 is increased, the objective lens 18 eclipses the peripheral part of the luminous flux, and inputs only the central part of the luminous flux, so that the focal length is decreased. In addition, when the luminous flux diameter of the information light beam LM at the time of being made incident on the objective lens 18 is increased, the peripheral part is eclipsed, and thus the light quantity of the information light beam LM applied to the optical disk 100 is decreased.

In addition, when the information light beam LM is converged greatly, the luminous flux diameter becomes smaller than the aperture of the objective lens 18. In this case, the objective lens 18 functions as a lens smaller than the real numerical aperture NA (0.85), so that the focal length is increased.

That is, when the objective lens 18 is displaced with the surface wobbling of the optical disk 100, the focal length and the light quantity of the information light beam LM are changed.

The information light condensing point changing mechanism 55R changes the convergence state of the information light beam LM by varying an interval C(X) between the movable lens 56 and the fixed lens 57 (which interval will hereinafter be referred to as an information relay interval). The information light condensing point changing mechanism 55R has a range of the information relay interval C(X) in which range the sameness of the focal length, a light quantity, and the like when the objective lens 18 is displaced can be ensured to a certain degree (which range of the information relay interval C(X) will hereinafter be referred to as a focus maintaining range). Thus, the conventional optical pickup cannot correct all of spherical aberration within such a focus maintaining range when the recording depth X varies greatly.

In addition, a so-called liquid crystal element may be used as the information light condensing point changing mechanism 55R. A liquid crystal element adds a spherical aberration to the information light beam LM by changing an index of refraction with respect to the optical axis of the information light beam LM. This liquid crystal element is limited in a range of changing the index of refraction, and is therefore unable to correct all of spherical aberration when the recording depth X varies greatly.

Accordingly, the optical pickup 17 according to the present invention reduces an amount of change in the lens depth interval D(X) according to the recording depth X by changing the working distance B(X) according to the recording depth X.

Figure 5:
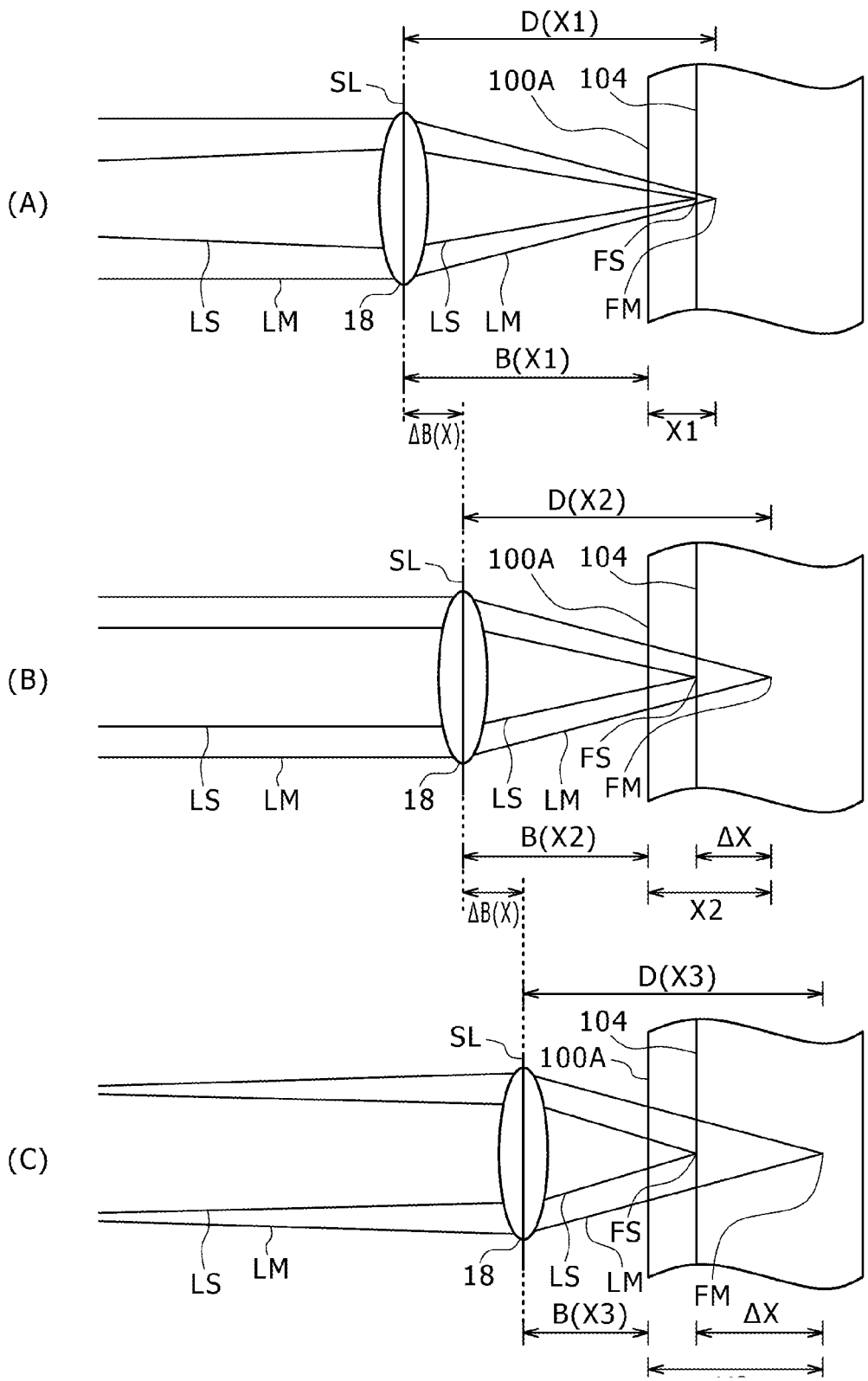
FIG. 5 is a schematic diagram of assistance in explaining relation between recording depth and a reference lens position according to a present embodiment.

Specifically, as shown in FIG. 5, the optical pickup 17 sets a reference lens position SL such that the working distance B(X) is decreased as a recording depth X1 is increased.

Figure 6:
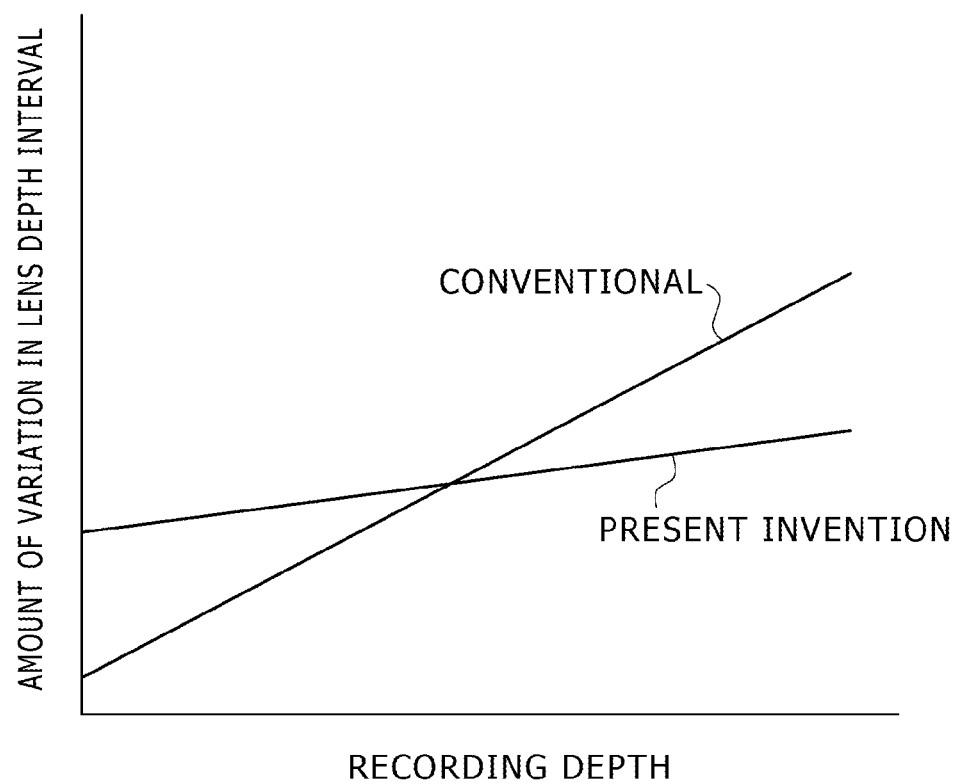
FIG. 6 is a schematic diagram showing relation between recording depth and a lens depth interval.

As shown in (A), (B), and (C) of FIG. 5, the optical pickup 17 can make the amount of displacement in the lens depth interval D(X) which amount of displacement is attendant on the displacement by ΔX of the recording depth X from X1 to X2 and to X3 smaller than ΔX. That is, as shown in FIG. 6, the optical pickup 17 can reduce the amount of variation in the lens depth interval D(X) (that is, an amount of variation in the information light focal position) with respect to variation in the recording depth X as compared with the conventional optical pickup.

Thereby, the optical pickup 17 can control an amount of driving of the movable lens 56 within the focus maintaining range, and properly correct the spherical aberration occurring within the optical disk 100 according to the recording depth X.

Specifically, as shown in FIG. 5, the optical pickup 17 moves the objective lens 18 to the reference lens position SL corresponding to the recording depth X. As a result, the optical pickup 17 needs to displace the servo light focal position according to changes in the working distance B(X).

Figure 7:
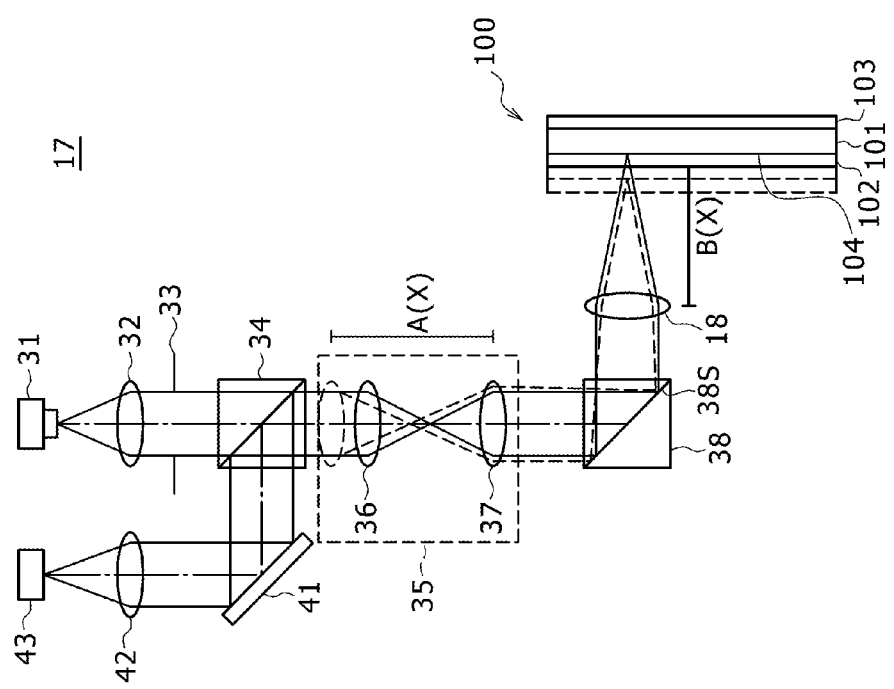
FIG. 7 is of assistance in explaining the control of a focal position of a servo light beam.

As described above, the optical pickup 17 has the servo light condensing point changing mechanism 35. As shown in FIG. 7, the optical pickup 17 varies an interval A(X) between the movable lens 36 and the fixed lens 37 (which interval will hereinafter be referred to as a servo relay interval) by driving the movable lens 36 in the servo light condensing point changing mechanism 35.

Thereby, the optical pickup 17 can displace the servo light focal position according to variation in the working distance B(X), and place the servo light focal position in the servo layer 104. Then, the optical pickup 17 can set the servo light focal position in a state of being focused on the servo layer 104 at all times by driving the objective lens 18 from the reference lens position SL according to the surface wobbling of the optical disk 100 or the like.

Incidentally, while variation in the working distance B(X) is represented by the displacement of the optical disk 100 for convenience in FIG. 7, the reference lens position SL of the objective lens 18 varies in actuality.

Figure 8:
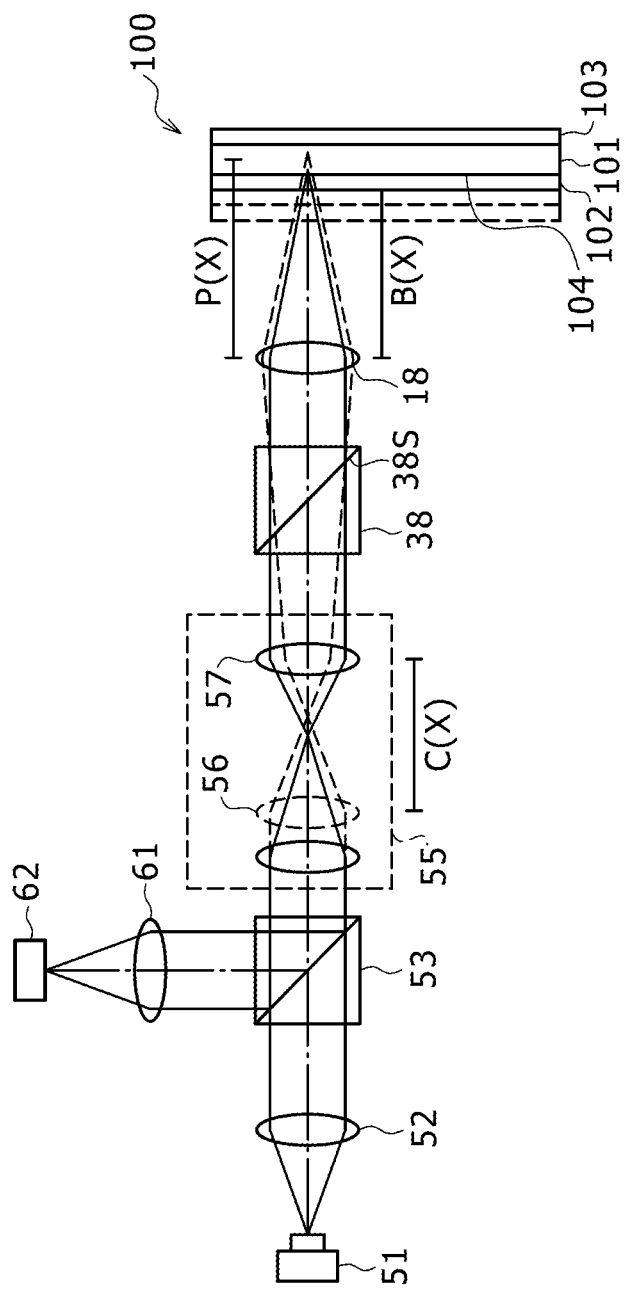
FIG. 8 is a schematic diagram of assistance in explaining the control of a focal position of an information light beam.

In addition, as shown in FIG. 8, the optical pickup 17 drives the movable lens 56 in the information light condensing point changing mechanism 55 so as to position the focus FM at the recording depth. At this time, the optical pickup 17 can reduce variation in the lens depth interval D(X) which variation is attendant on variation in the recording depth X. The optical pickup 17 can therefore control the amount of variation in the information relay interval C(X) within the focus maintaining range.

Figure 9:
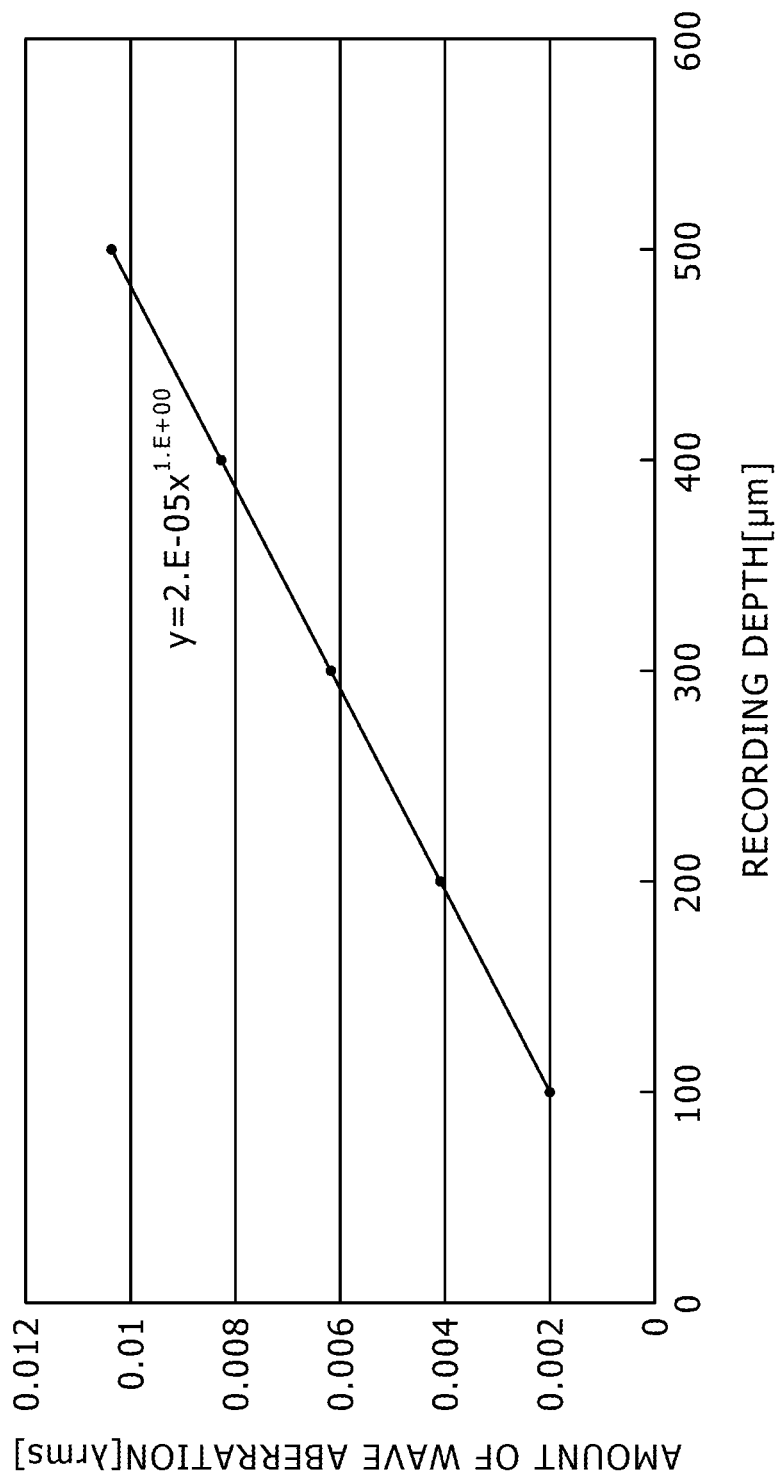
FIG. 9 is a schematic diagram showing relation between recording depth and aberration in collimated light.

FIG. 9 is a graph showing relation between an amount of aberration occurring within the optical disk 100 and the recording depth X when collimated light is made incident on the objective lens 18. As is understood from the figure, the amount of aberration occurring within the optical disk 100 can be linearly approximated, and said to be substantially in direct proportion to the recording depth X.

Figure 10:
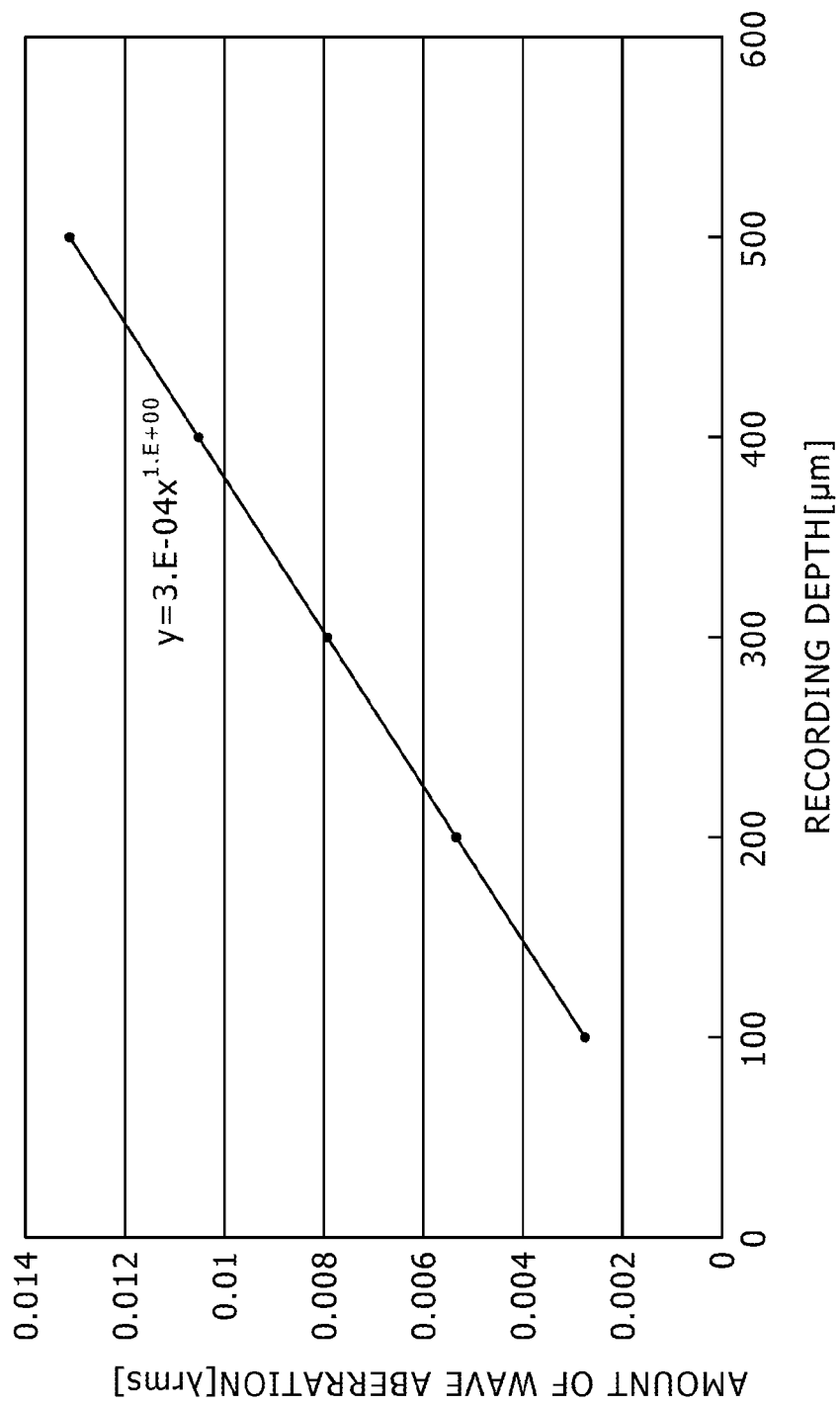
FIG. 10 is a schematic diagram showing relation between recording depth and aberration in convergent and divergent light.

In addition, FIG. 10 is a graph showing relation between the amount of aberration occurring within the optical disk 100 and the recording depth X when convergent light or divergent light is made incident on the objective lens 18. As is understood from the figure, the amount of aberration occurring within the optical disk 100 can be linearly approximated, and said to be substantially in direct proportion to the recording depth X, though the slope of the amount of aberration occurring within the optical disk 100 differs from that of FIG. 9.

That is, the following two points are derived from the graphs of FIG. 9 and FIG. 10.

1) The amount of aberration is proportional to the recording depth irrespective of the convergence state of the information light beam LM at the time of being made incident on the objective lens 18.

2) The amount of aberration occurring within the optical disk 100 varies according to the convergence state of the information light beam LM.

That is, it can be said that the optical pickup 17 is able to vary the aberration occurring within the optical disk 100 by changing the convergence state of the information light beam LM made incident on the objective lens 18.

Figure 11:
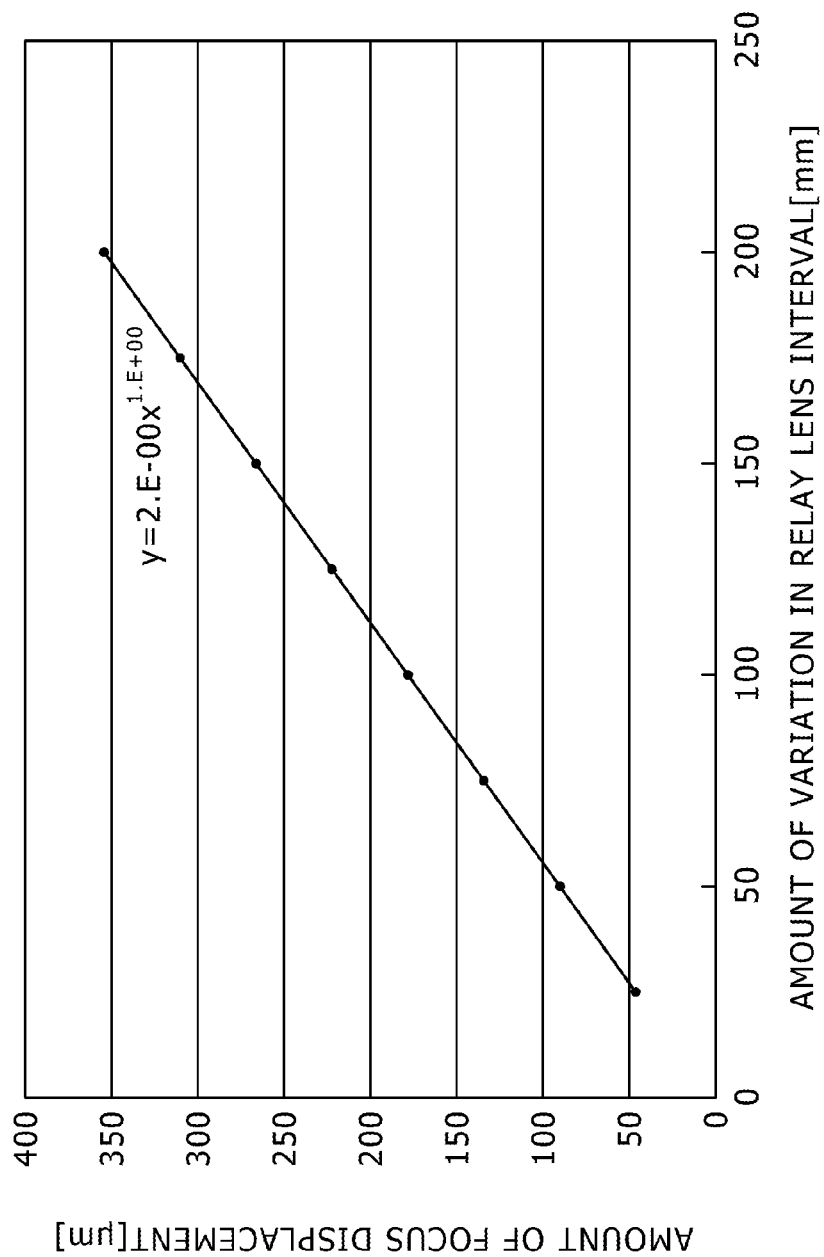
FIG. 11 is a schematic diagram showing relation between variation in relay lens interval and an amount of displacement of a focus.

FIG. 11 shows relation between the amount of variation in the information relay interval C(X) and an amount of displacement of the focus FM. Incidentally, the figure shows an amount of displacement of the information light focal position in the direction of an optical axis in a case where the focus when the information relay interval C(X)=0 [µm] is at 0 [µm]. As is understood from the figure, the amount of displacement of the focus can be linearly approximated, and said to be substantially in direct proportion to the information relay interval C(X).

When the working distance B(X) is linearly changed according to the recording depth X, relation between the working distance B(X) and the information relay interval C(X) can be expressed as a linear function as follows:

$$B(X)=K_1 \times C(X)+Ka \quad (1)$$

where $K_1$ and Ka are a constant.

Incidentally, while the information light beam LM has been described with reference to FIGS. 9 to 11, the same relations apply to light in general, and holds also for the servo light beam LS.

That is, the optical pickup 17 varies the working distance B(X) and also varies the servo relay interval A(X) as the recording depth X is varied. At this time, because the distance from the plane of incidence 100A to the servo layer 104 is constant at all times, the servo relay interval A(X) is determined according to the working distance B(X). Thus, relation between the working distance B(X) and the servo relay interval A(X) can be expressed as a linear function as follows:

$$B(X)=K_2 \times A(X)+Kb \quad (2)$$

where $K_2$ and Kb are a constant.

Figure 12:
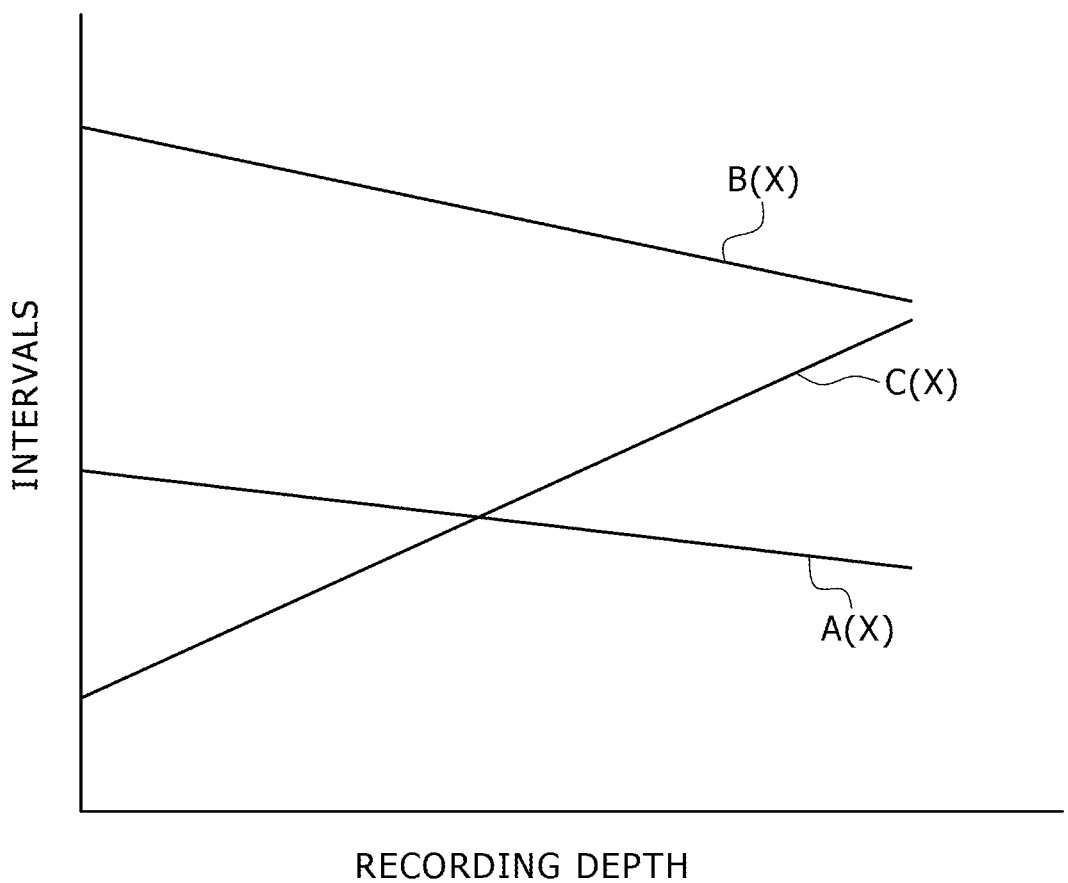
FIG. 12 is a schematic diagram showing relation between recording depth and intervals.

That is, as shown in FIG. 12, when the recording depth X is set, the working distance B(X) is determined, and the servo relay interval A(X) and the information relay interval C(X) are determined accordingly. Hence, the driving control section 12 of the optical disk device 10 (FIG. 2) stores a table associating the recording depth X with the working distance B(X), for example. The driving control section 12 applies a voltage corresponding to the working distance B(X) to the two-axis actuator 19 to thereby move the objective lens 18 to the reference lens position SL corresponding to the recording depth X.

Further, the driving control section 12 calculates the servo relay interval A(X) and the information relay interval C(X) according to Equation (1) and Equation (2). The driving control section 12 applies voltages corresponding to the servo relay interval A(X) and the information relay interval C(X) that have been calculated to the movable lenses 36 and 56. The driving control section 12 can thereby set the servo relay interval A(X) and the information relay interval C(X) to the intervals calculated according to the recording depth X.

Thus, the optical pickup 17 changes the working distance B(X) according to the recording depth X, and focuses the servo light focal position on the servo layer 104 by the servo light condensing point changing mechanism 35 for changing the servo focal position.

The optical pickup 17 can thereby reduce the amount of variation in the lens depth interval D(X). It is thus possible to reduce the amount of displacement of the information light focal position, and control the amount of variation in the information relay interval C(X) within the focus maintaining range. As a result, the optical pickup 17 can properly correct the aberration of the information light beam LM which aberration occurs within the optical disk 100 according to the recording depth X.

[1-4. Operation and Effect]

According to the above constitution, the optical disk 100 as an optical recording medium has the recording layer 101 in which information is recorded by forming a three-dimensional recording mark RM and the servo layer 104 for the servo which servo layer is provided so as to be adjacent to the recording layer 101. The optical disk device 10 condenses the information light beam LM as information light with which to irradiate the recording layer 101 and the servo light beam LS as servo light with which to irradiate the servo layer 104 by the objective lens 18.

The optical disk device 10 displaces the objective lens 18 so that the objective lens is displaced to the reference lens position SL as a reference. The optical disk device 10 controls the information light condensing point changing mechanism 55 so that the focus FM of the information light beam LM is adjusted to the recording depth X at which the information light beam LM is to be applied in a state in which the objective lens 18 is positioned at the reference lens position SL. The optical disk device 10 controls the servo light condensing point changing mechanism 35 so that the focus FS of the servo light beam LS is adjusted to the servo layer 104 in the state in which the objective lens 18 is positioned at the reference lens position SL.

The optical disk device 10 can thereby correct the spherical aberration of the servo light beam LS by the servo light condensing point changing mechanism 35. Thus, the reference lens position SL can be varied. Because the optical disk device 10 has the information light condensing point changing mechanism 55, and can vary the reference lens position SL, the optical disk device 10 can properly correct such spherical aberration as cannot be entirely corrected by the conventional optical pickup.

The optical disk device 10 displaces the objective lens 18 according to variation in position of the servo layer 104 so that the servo light beam LS is focused on the servo layer 104. The optical disk device 10 varies the reference lens position SL according to the recording depth X at which the information light beam LM is to be applied. At this time, the optical disk device 10 sets the reference lens position SL such that the amount of displacement of the focus FM of the information light beam LM (that is, the amount of displacement of the lens depth interval D(X)) according to the recording depth X is smaller than the amount of displacement ΔX of the recording depth X.

Thereby, the optical disk device 10 can decrease the amount of displacement of the lens depth interval D(X), and reduce an amount of spherical aberration to be added by the information light condensing point changing mechanism 55 to within the focus maintaining range in which the sameness of the focal length and the like when the objective lens 18 is displaced can be maintained. As a result, the optical disk device 10 can properly correct the spherical aberration of the information light beam LM within the focus maintaining range even when the amount of displacement ΔX of the recording depth X is large.

The optical disk device 10 sets the amount of displacement of the reference lens position SL (that is, the amount of displacement of the working distance B(X)) smaller than the amount of displacement ΔX of the recording depth X.

Thereby, the optical disk device 10 can minimize the amount of displacement of the working distance B(X), and reduce an amount of spherical aberration to be corrected in the servo light beam LS.

The information light condensing point changing mechanism 55 is a relay lens formed by the combination of the movable lens 56 and the fixed lens 57. The focus FM of the information light beam LM is displaced by changing the information relay interval C(X) between the movable lens 56 and the fixed lens 57. The servo light condensing point changing mechanism 35 is a relay lens formed by the combination of the movable lens 36 and the fixed lens 37. The focus FS of the servo light beam LS is displaced by changing the servo relay interval A(X) between the movable lens 36 and the fixed lens 37.

The optical disk device 10 can thereby displace the focuses FM and FS by driving the movable lenses 56 and 36.

The information light condensing point changing mechanism 55 is a relay lens formed by the combination of the convex movable lens 56 and the convex fixed lens 57. Thereby, the optical disk device 10 adds a spherical aberration easily, and is thus able to minimize spherical aberration at the recording depth X of the information light beam LM.

The optical disk device 10 is designed such that the working distance B(X) as an interval between the reference lens position SL and the optical disk 100, the information relay interval C(X), and the servo relay interval A(X) when the information light beam LM forms the focus FM at the recording depth X and the servo light beam LS forms the focus FS on the servo layer 104 are substantially expressed by the relation of a linear function according to the recording depth X.

Thereby, the optical disk device 10 can linearly connect each factor, and control the movable lenses 56 and 36 and the objective lens 18 easily.

The optical disk device 10 multiplies one factor determined according to the recording depth X among the respective factors of the working distance B(X), the information relay interval C(X), and the servo relay interval A(X) by a constant, and thereby calculates another factor. For example, after determining the working distance B(X), the optical disk device 10 can calculate the information relay interval C(X) and the servo relay interval A(X) by simple calculation according to Equation (1) and Equation (2).

Thereby, the optical disk device 10 can easily calculate the information relay interval C(X) and the servo relay interval A(X).

According to the above constitution, the optical disk device 10 condenses the information light beam LM and the servo light beam LS via the same objective lens 18, and applies the information light beam LM at the recording depth X of the recording layer 101 with the servo layer 104 irradiated with the servo light beam LS as a reference. The optical disk device 10 has the information light condensing point changing mechanism 55 for separating the focus FM of the information light beam LM from the focus FS of the servo light beam LS by an arbitrary separation distance d as well as the servo light condensing point changing mechanism 35 for displacing the focus FS.

Thereby, the optical disk device 10 can properly correct the spherical aberration of the information light beam LM using the information relay interval C(X) and the working distance B(X).

2. Second Embodiment

In a second embodiment, parts corresponding to those of the first embodiment shown in FIGS. 1 to 12 are identified by the same reference numerals, and description of the same parts will be omitted. The second embodiment is different from the first embodiment in that the information relay interval C(X) for the recording depth X is changed according to the index of refraction of the optical disk 100.

[2-1. Correction of Spherical Aberration]

In general, standards for optical disks define the range of the index of refraction of materials used for the optical disk 100. In other words, only the range of the index of refraction of the optical disk 100 is defined, and no unique value is defined for the index of refraction of the optical disk 100. The index of refraction therefore changes according to a manufacturer and a type of the optical disk 100.

In other words, in the case where the focus FS of the servo light beam LS and the focus FM of the information light beam LM are separated from each other by a separation distance d with a certain index of refraction as a reference, when the index of refraction differs, an actual separation distance d changes, and the focus FM cannot be positioned at the recording depth X.

Accordingly, an optical disk device 110 in the second embodiment corrects the interval between the focus FS of the servo light beam LS and the focus FM of the information light beam LM by correcting the information relay interval C(X) according to the index of refraction of the optical disk 100.

When the index of refraction of the optical disk 100 changes, an amount of spherical aberration occurring according to the recording depth X changes. The optical disk device 110 therefore corrects the slope of the information relay interval C(X) (FIG. 12) according to the recording depth X.

In addition, the optical disk device 110 drives an objective lens 18 so as to focus the servo light beam LS on a servo layer 104. In the optical disk device 110, the spherical aberration of the servo light beam LS is minimized when the objective lens 18 is positioned at a reference lens position SL. When the index of refraction of the optical disk 100 is changed, the objective lens 18 is displaced from the reference lens position SL, and the spot of the servo light beam LS is enlarged due to an effect of the spherical aberration.

Accordingly, the optical disk device 110 corrects the working distance B(X) according to the index of refraction of the optical disk 100, and positions the objective lens 18 as close to the reference lens position SL as possible.

Specifically, indicating information on the index of refraction such as indicates the index of refraction of a recording layer 101 and a substrate 102 or the working distance B(X) to be set according to the index of refraction is recorded in the innermost circumference of a first mark layer Y from the servo layer 104 in the recording layer 101 of the optical disk 100.

When the optical disk 100 is loaded, the optical disk device 110 performs a focus search, and focuses the servo light beam LS on the servo layer 104. For example, a driving control section 12 has a table associating the recording depth X, the working distance B(X), the information relay interval C(X), and the servo relay interval A(X) with each other. The optical disk device 110 sets Recording Depth X=First Mark Layer Y, read the working distance B(X), the information relay interval C(X), and the servo relay interval A(X) corresponding to the first layer from the table stored in advance, and reads the indicating information in the innermost circumference on the basis of the working distance B(X), the information relay interval C(X), and the servo relay interval A(X).

In this case, the optical disk 100 has the indicating information recorded in the first mark layer Y from the servo layer 104. The optical disk device 110 focuses the servo light beam LS on the servo layer 104. Thus, aberration occurring due to a difference in the index of refraction corresponds to the recording depth X of the first mark layer Y.

That is, the optical disk 100 has the indicating information recorded in the first mark layer Y at a smallest recording depth X, whereby the optical disk device 110 can be made to read the indicating information with the aberration occurring according to the difference in the index of refraction minimized.

Description in the following will be made of a case in which a WD correction coefficient and an information correction coefficient according to the recording depth X are recorded as the indicating information. The driving control section 12 selects the working distance B(X) according to the recording depth X. The driving control section 12 multiplies the selected working distance B(X) by the WD correction coefficient, calculates a corrected working distance Bc(X), and determines the reference lens position SL on the basis of the corrected working distance Bc(X).

The driving control section 12 selects the servo relay interval A(X) corresponding to the corrected working distance Bc(X) as a corrected servo relay interval Ac(X) from the table. That is, the driving control section 12 selects the working distance B(X) and the servo relay interval A(X) to which an offset is added according to the index of refraction and which correspond to the recording depth X as the corrected working distance Bc(X) and the corrected servo relay interval Ac(X), respectively.

Thereby, the driving control section 12 can prevent the objective lens 18 from continuing being placed in a position closer or more distant than the reference lens position SL due to an effect of the index of refraction, and can maintain the spherical aberration of the servo light beam LS in the servo layer 104 in a minimum state.

Further, the driving control section 12 selects the information relay interval C(X) corresponding to the corrected working distance Bc(X) from the table. The driving control section 12 calculates a corrected information relay interval C(X) by multiplying the selected information relay interval C(X) by the information correction coefficient according to the recording depth X. That is, the driving control section 12 corrects the slope of the information relay interval C(X) according to the indicating information, and selects a value corresponding to the corrected working distance Bc(X) as the corrected information relay interval Cc(X) from the information relay interval C(X) whose slope is corrected.

Thereby, the driving control section 12 can correct the spherical aberration occurring according to the recording depth X due to variation in the index of refraction, and can properly correct even the spherical aberration occurring according to variation in the reference lens position SL.

In addition, when the index of refraction of the recording layer 101 and the substrate 102 is recorded as the indicating information, the optical disk device 110 calculates a corrected working distance Bc(X) that can minimize aberration at the focus FM on the basis of the recorded index of refraction, and determines the reference lens position SL.

The optical disk device 110 thus corrects aberration occurring according to a difference in index of refraction in each optical disk 100 by correcting the relation between the working distance B(X), the servo relay interval A(X), and the information relay interval C(X).

The optical disk device 110 can thereby correct the spherical aberration of the information light beam LM to minimize spherical aberration at the focus FM, so that recording density can be improved by reducing spot size.

[2-2. Operation and Effect]

In the above constitution, the optical disk device 110 corrects the relation between the working distance B(X), the information relay interval C(X), and the servo relay interval A(X) on the basis of the index of refraction of the optical disk 100. For example, the optical disk device 110 corrects the working distance B(X) according to the index of refraction of the optical disk 100.

The optical disk device 110 can thereby properly correct spherical aberration changing according to the index of refraction of the optical disk 100.

In other words, the optical disk device 110 has a servo light condensing point changing mechanism 35, and is able to change the working distance B(X). Thus, while properly correcting the spherical aberration of the servo light beam LS, the optical disk device 110 can change the relation between the working distance B(X) and the information relay interval C(X) according to the index of refraction of the optical disk 100, and properly correct the spherical aberration changing according to the index of refraction.

At this time, the optical disk device 110 corrects the relation between the working distance B(X), the information relay interval C(X), and the servo relay interval A(X) according to the indicating information indicating information on the index of refraction of the optical disk 100.

Thereby, the optical disk device 110 is saved the trouble of measuring the index of refraction, and can properly correct the spherical aberration changing according to the index of refraction with a simple constitution.

The optical disk device 110 reproduces information recorded in the recording layer 101 on the basis of an information reflected light beam LMr as return light from the recording layer 101. The optical disk device 110 corrects the relation between the working distance B(X), the information relay interval C(X) in the information light condensing point changing mechanism 55, and the servo relay interval A(X) in the servo light condensing point changing mechanism 35 on the basis of the reproduced indicating information on the index of refraction of the optical disk 100.

Thereby, the optical disk device 110 can correctly recognize the information on the index of refraction of each optical disk 100, and can correct spherical aberration occurring within the optical disk 100 with high accuracy.

The optical disk 100 has the recording layer 101 in which information is recorded by forming three-dimensional recording marks RM over a plurality of mark layers Y and the servo layer 104 for a servo. The optical disk 100 has the indicating information recorded in the first mark layer Y from the servo layer 104 in the recording layer 101.

The optical disk 100 thereby allows readout of the indicating information recorded in the first layer from a plane of incidence 100A in which first layer spherical aberration is suppressed as much as possible. Thus, even when the spherical aberration is not corrected according to the index of refraction, the optical disk device 110 can read the indicating information in a state of a small spherical aberration.

According to the above constitution, the optical disk device 110 corrects the working distance B(X) and the servo relay interval A(X) according to the index of refraction of the optical disk 100. The optical disk device 110 can thereby correct the spherical aberration of the servo light beam LS which spherical aberration occurs according to a difference in the index of refraction of each optical disk 100.

In addition, the optical disk device 110 corrects the interval d from the focus FS of the servo light beam LS to the focus FM of the information light beam LM by correcting the slope of the information relay interval C(X) with respect to the recording depth X according to the index of refraction of the optical disk 100. The optical disk device 110 can thereby correct the spherical aberration of the information light beam LM which spherical aberration occurs according to a difference in the index of refraction of each optical disk 100.

Further, the optical disk device 110 corrects the information relay interval C(X) as the working distance B(X) is corrected. The optical disk device 110 can thereby correct the spherical aberration of the information light beam LM which spherical aberration is caused by correcting the working distance B(X).

3. Other Embodiments

Incidentally, in the foregoing first and second embodiments, description has been made of a case where the information light condensing point changing mechanism 55 and the servo light condensing point changing mechanism 35 are both formed by a relay lens. The present invention is not limited to this. For example, one or both of the information light condensing point changing mechanism and the servo light condensing point changing mechanism may be formed by a liquid crystal element. In addition, a light condensing point changing mechanism formed by another system can of course be used.

In addition, in the foregoing first and second embodiments, description has been made of a case where the information light condensing point changing mechanism 55 is a relay lens formed by the combination of the convex movable lens 56 and the convex fixed lens 57. The present invention is not limited to this. For example, the information light condensing point changing mechanism 55 may be a relay lens formed by a combination of a concave lens and a convex lens. In this case, an optical path length can be shortened, which is advantageous for miniaturization of the optical pickup.

Further, in the foregoing first and second embodiments, description has been made of a case where the wavelength of the information light beam LM is different from the wavelength of the servo light beam LS. The present invention is not limited to this. These wavelengths may be the same. An optical pickup having such a constitution is described in Patent Document 2, for example. The present invention can be applied by providing a servo light condensing point changing mechanism in the optical path of a servo light beam in the optical pickup described in Patent Document 2.

Further, in the foregoing first embodiment, description has been made of a case where the amount of displacement of the focus FM of the information light beam LM according to the recording depth is smaller than the amount of displacement of the recording depth X. The present invention is not limited to this. For example, the amount of displacement of the focus FM of the information light beam LM according to the recording depth may be equal to the amount of displacement of the recording depth X. That is, the present invention may change only the interval between the focuses FM and FS according to the index of refraction. Even in this case, the present invention can minimize the spherical aberration of the servo light beam LS and the information light beam LM irrespective of variation in the index of refraction.

Incidentally, though not specifically mentioned in the second embodiment, when the substrate 102 and the recording layer 101 have different indexes of refraction, the relation between the working distance B(X), the information relay interval C(X), and the servo relay interval A(X) is desirably corrected according to each of the indexes of refraction. For example, the working distance B(X) and the servo relay interval A(X) are determined according to the index of refraction of the substrate 102. The information relay interval C(X) is offset according to the index of refraction of the substrate 102, and the slope of the information relay interval C(X) is corrected according to the index of refraction of the recording layer 101.

Further, in the foregoing second embodiment, description has been made of a case where the working distance B(X) as one factor is determined on the basis of the table stored in advance, and the servo relay interval A(X) and the information relay interval C(X) as the other factors are determined on the basis of the working distance B(X). The present invention is not limited to this. The servo relay interval A(X) or the information relay interval C(X) may be determined as one factor, and the other factors may be determined on the basis of the determined factor.

Further, in the foregoing embodiment, description has been made of a case where the indicating information is recorded in the innermost circumference of the first mark layer Y from the servo layer 104 in the optical disk 100. The present invention is not limited to this. There is no limitation on a location at which the indicating information is recorded.

Further, in the foregoing embodiment, description has been made of a case where one factor is determined by using a table. The present invention is not limited to this. One factor may be determined by calculation from the recording depth X.

Further, in the foregoing first and second embodiments, description has been made of a case where a recording mark made of air bubbles is formed as a three-dimensional recording mark RM. The present invention is not limited to this. For example, a recording mark RM may be formed by the modulation of the index of refraction according to chemical change, or a recording mark RM may be formed by a hologram. An optical pickup forming a recording mark RM by a hologram is described in Patent Document 3. The present invention can be applied by providing a servo light condensing point changing mechanism in the optical path of a servo light beam in the optical pickup described in Patent Document 3.

Further, in the foregoing embodiments, description has been made of a case where the wavelength of the information light beam LM is about 405 [nm] and the wavelength of the servo light beam LS is about 660 [nm]. The present invention is not limited to this. There is no limitation on the wavelength of the information light beam LM and the servo light beam LS.

Further, in the foregoing embodiments, description has been made of a case where the numerical aperture of the objective lens 18 is about 0.85 (0.83 to 0.87). The present invention is not limited to this. Lenses having various numerical apertures may be used.

Further, in the foregoing embodiments, description has been made of a case where an aperture for the servo light beam LS is limited, and the objective lens 18 is made to function as a lens having a numerical aperture NA of about 0.613 for the servo light beam LS. The present invention is not limited to this. An appropriate numerical aperture NA can be selected by the aperture of the aperture limiting section. It is particularly desirable to make the objective lens 18 function as a lens having a numerical aperture NA=0.60 to 0.70. This is because a recording density similar to that of a BD can be achieved as described above and because of a past record of actual use in DVD (numerical aperture NA=0.65).

Further, in the foregoing first and second embodiments, description has been made of a case where a disk-shaped optical disk is used as an optical recording medium. The present invention is not limited to this. For example, an optical recording medium in the shape of a cube may be used. In this case, the optical disk device (optical information device) does not have the spindle motor, but is provided with an XY stage for driving the optical recording medium in an X-direction and a Y-direction perpendicular to the focus direction. Even in this case, the constitution of the optical pickup is similar to that of the first embodiment. However, because surface wobbling does not occur easily, the present invention holds even without the displacement of the objective lens due to variation in position of the servo layer.

Further, in the foregoing first and second embodiments, description has been made of a case where the optical disk 100 has the recording layer 101, the servo layer 104, and the substrates 102 and 103. The present invention is not limited to this. The substrates 102 and 103 are not necessarily needed. In addition, a protective layer of a thin film may be provided in place of the substrates 102 and 103.

Further, in the foregoing first and second embodiments, description has been made of a case where the servo layer 104 is provided on the side of the plane of incidence 100A (between the substrate 102 and the recording layer 101). The present invention is not limited to this. The servo layer 104 may be provided on an opposite side from the plane of incidence (between the substrate 103 and the recording layer 101), in the center of the recording layer 101, or the like.

Further, in the foregoing second embodiment, description has been made of a case where the optical disk device 10 has the servo light condensing point changing mechanism 35. The present invention is not limited to this. It suffices for the optical disk device at least to have the information light condensing point changing mechanism 55. In this case, the optical disk device controls the two-axis actuator 19 so that the objective lens 18 is displaced to the reference lens position as a reference, controls the information light condensing point changing mechanism 55 so that the focus of the information light beam LM is adjusted to the recording depth X at which the information light beam LM is to be applied, and changes the reference position according to the index of refraction of the optical recording medium 100. Even in this case, it is possible to produce an effect of being able to apply the information light beam LM at the recording depth X as a target at all times irrespective of change in the index of refraction of the optical recording medium 100, the effect being similar to that of the second embodiment.

Further, in the foregoing embodiments, description has been made of a case where the optical disk device 10 as an optical disk device is composed of the objective lens 18 as an objective lens, the two-axis actuator 19 as a lens driving section, the information light condensing point changing mechanism 55 as an information light condensing point changing mechanism, the servo light condensing point changing mechanism 35 as a servo light condensing point changing mechanism, and the driving control section 12 as a control section. The present invention is not limited to this. The optical disk device according to the present invention may be formed by an objective lens, a lens driving section, an information light condensing point changing mechanism, a servo light condensing point changing mechanism, and a control section that are formed by various other constitutions.

Further, in the foregoing embodiments, description has been made of a case where the optical disk 100 as an optical recording medium is formed by the recording layer 101 as a recording layer and the servo layer 104 as a servo layer. The present invention is not limited to this. The optical recording medium according to the present invention may be formed by a recording layer and a servo layer that are formed by various other constitutions.

INDUSTRIAL APPLICABILITY

The present invention can also be used in for example an optical information recording and reproducing device for recording or reproducing high-volume information such for example as video contents and audio contents on a recording medium such as an optical disk.

DESCRIPTION OF REFERENCE SYMBOLS

10, 110 . . . Optical disk device, 11 . . . Control section, 12 . . . Driving control section, 13 . . . Signal processing section, 18 . . . Objective lens, 19 . . . Two-axis actuator, 35 . . . Servo light condensing point changing mechanism, 36, 56 . . . Movable lens, 37, 57 . . . Fixed lens, 55 . . . Information light condensing point changing mechanism, X . . . Recording depth, A(X) . . . Servo relay interval, B(X) . . . Working distance, C(X) . . . Information relay interval, LM . . . Information light beam, LS . . . Servo light beam, FS, FM . . . Focus, RM . . . Recording mark

The invention claimed is:

1. An optical disk device comprising:
an objective lens for condensing information light applied to a recording layer of an optical recording medium, the optical recording medium having said recording layer for recording information by forming a three-dimensional recording mark and a servo layer for a servo, the servo layer being disposed so as to be adjacent to the recording layer, and condensing servo light applied to said servo layer;
a lens driving section configured to displace said objective lens;
an information light condensing point changing mechanism for displacing a focus of said information light;
a servo light condensing point changing mechanism for displacing a focus of said servo light; and
a control section configured to:
control said lens driving section so as to displace said objective lens to a reference lens position, the reference lens position determined based upon a recording depth at which said information light is applied;
control said information light condensing point changing mechanism so as to adjust the focus of said information light to the recording depth when the objective lens is placed at said reference lens position; and control said servo light condensing point changing mechanism so as to adjust the focus of said servo light to said servo layer when the objective lens is placed at said reference lens position.

2. The optical disk device according to claim 1, wherein said lens driving section displaces said objective lens according to variation in position of said servo layer so that said servo light is focused on said servo layer.

3. The optical disk device according to claim 2, wherein said control section sets said reference lens position such that an amount of displacement of the focus of said information light according to said recording depth is smaller than an amount of displacement of said recording depth.

4. The optical disk device according to claim 3, wherein said control section sets an amount of displacement of said reference lens position smaller than the amount of displacement of said recording depth.

5. The optical disk device according to claim 4, wherein said information light condensing point changing mechanism is a relay lens formed by a combination of a movable lens and a fixed lens, and displaces the focus of said information light by changing an information relay interval between the movable lens and the fixed lens, and said servo light condensing point changing mechanism is a relay lens formed by a combination of a movable lens and a fixed lens, and displaces the focus of said servo light by changing a servo relay interval between the movable lens and the fixed lens.

6. The optical disk device according to claim 5, wherein said objective lens is designed such that said reference lens position, said information relay interval, and said servo relay interval when said information light forms the focus at said recording depth and said servo light forms the focus on said servo layer are substantially expressed by relation of a linear function according to the recording depth.

7. The optical disk device according to claim 6, wherein said control section multiplies a first factor determined according to the recording depth and a constant associated with one of: an interval between said reference lens position and said optical disk, said information relay interval, or said servo relay interval, thereby calculating a second factor.

8. The optical disk device according to claim 5, wherein said control section corrects a relation between a working distance, said information relay interval, and said servo relay interval according to an index of refraction of said optical disk.

9. The optical disk device according to claim 8, wherein said control section corrects said working distance according to the index of refraction of said optical disk.

10. The optical disk device according to claim 3, wherein a wavelength of said information light is different from a wavelength of said servo light.

11. The optical disk device according to claim 10, wherein the wavelength of said information light is about 405 [nm], the wavelength of said servo light is about 660 [nm], and a numerical aperture of said objective lens is about 0.85.

12. The optical disk device according to claim 11, further comprising an aperture limiting section configured to limit an aperture of said servo light, and make said objective lens function as a lens having an numerical aperture of 0.60 to 0.70 for said servo light.

13. The optical disk device according to claim 4, wherein at least one of said information light condensing point changing mechanism and said servo light condensing point changing mechanism is formed by a liquid crystal element.

14. The optical disk device according to claim 2, wherein said control section corrects a working distance as an interval between said reference lens position and said optical disk on a basis of an index of refraction of said optical recording medium.

15. The optical disk device according to claim 14, wherein said control section corrects an interval from the focus of said servo light to the focus of said information light on a basis of the index of refraction of said optical recording medium.

16. The optical disk device according to claim 15, further comprising a reproducing section configured to reproduce information recorded in said recording layer on a basis of return light from said recording layer, wherein said control section corrects a relation between said working distance, said information light condensing point changing mechanism, and said servo light condensing point changing mechanism on a basis of indicating information on the index of refraction of said optical recording medium, the indicating information being reproduced by said reproducing section.

17. An optical pickup comprising:
an objective lens for condensing information light applied to a recording layer of an optical recording medium, the optical recording medium having said recording layer for recording information by forming a three-dimensional recording mark and a servo layer for a servo, the servo layer being disposed so as to be adjacent to the recording layer, and condensing servo light applied to said servo layer;
a lens driving section configured to displace said objective lens to a reference lens position, the reference lens position determined based upon a recording depth at which said information light is applied;
an information light condensing point changing mechanism for displacing a focus of said information light so as to adjust the focus of said information light to the recording depth at which the information light is to be applied in a state of said objective lens being placed at said reference lens position; and
a servo light condensing point changing mechanism for displacing a focus of said servo light so as to adjust the focus of said servo light to said servo layer in a state of said information light condensing point changing mechanism being controlled and said objective lens being placed at said reference lens position.

18. An optical recording medium comprising:
a recording layer for recording information by forming a three-dimensional recording mark over a plurality of mark layers; and
a servo layer for a servo;
wherein indicating information on an index of refraction is recorded in a first said mark layer from a plane of incidence in said recording layer, and
wherein the first said mark layer is a mark layer of the plurality of mark layers that is closest to the servo layer.

19. An optical disk device comprising:
an objective lens for condensing information light applied to a recording layer of an optical recording medium, the optical recording medium having said recording layer for recording information by forming a three-dimensional recording mark and a servo layer for a servo, the servo layer being disposed so as to be adjacent to the recording layer, and condensing servo light applied to said servo layer;

a lens driving section configured to displace said objective lens;

an information light condensing point changing mechanism for displacing a focus of said information light; and a control section configured to adjust an interval from a focus of said servo light to the focus of said information light so as to adjust the focus of said information light to a recording depth at which said information light is to be applied, and correct the interval from the focus of said servo light to the focus of said information light on a basis of an index of refraction of said optical recording medium, by controlling said information light condensing point changing mechanism.

* * * * *